United States Patent [19]
Richley

[11] Patent Number: 5,900,858
[45] Date of Patent: May 4, 1999

[54] ROTATION MECHANISM FOR BICHROMAL BALLS OF A TWISTING BALL DISPLAY SHEET BASED ON CONTACT POTENTIAL CHARGING

[75] Inventor: Edward A. Richley, Palo Alto, Calif.

[73] Assignee: Xerox Corporation, Stamford, Conn.

[21] Appl. No.: 08/866,536

[22] Filed: May 30, 1997

[51] Int. Cl.⁶ ..................................................... G09G 3/34
[52] U.S. Cl. ................................................................ 345/107
[58] Field of Search ................................ 345/84, 85, 30, 345/55, 107

[56] References Cited

U.S. PATENT DOCUMENTS 5,708,525  1/1998  Sheridon ................................. 345/107

*Primary Examiner*—Matthew Luu
*Attorney, Agent, or Firm*—Fariba Rad

[57] ABSTRACT

A twisting ball display sheet is disclosed which utilizes a mechanism other than Zeta potential to create dipole moment to rotate a plurality of bichromal balls. The twisting ball display sheet comprises a transparent sheet which contains a plurality of bichromal balls. Each bichromal ball comprises two hemisphere. Each hemisphere has a material which has a different work function than the work function of the other hemisphere. The two different work functions of each bichromal ball create a dipole moment which at the presence of a proper electric filed will cause the bichromal ball to rotate.

22 Claims, 5 Drawing Sheets

FIG. 6
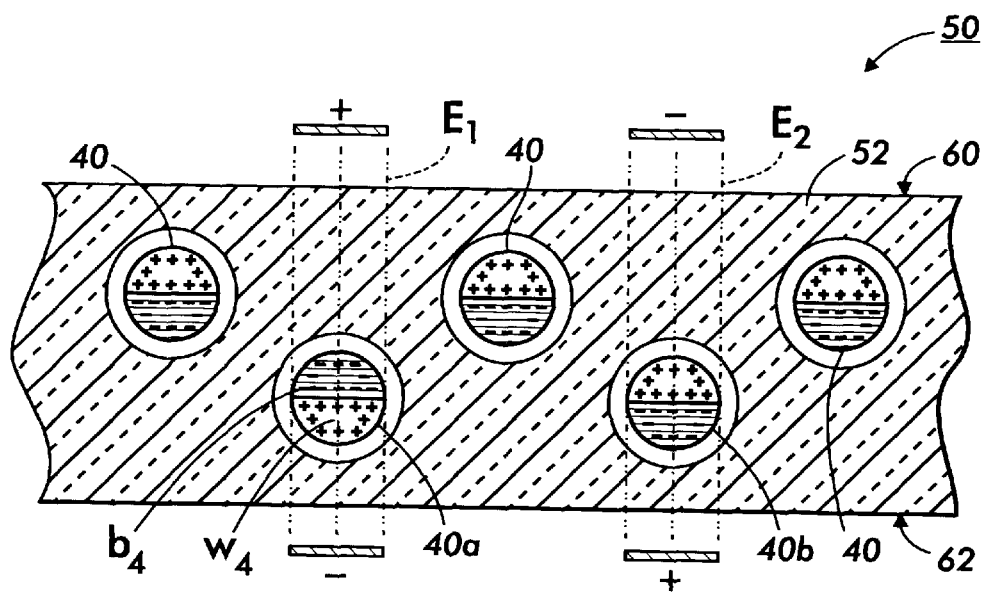
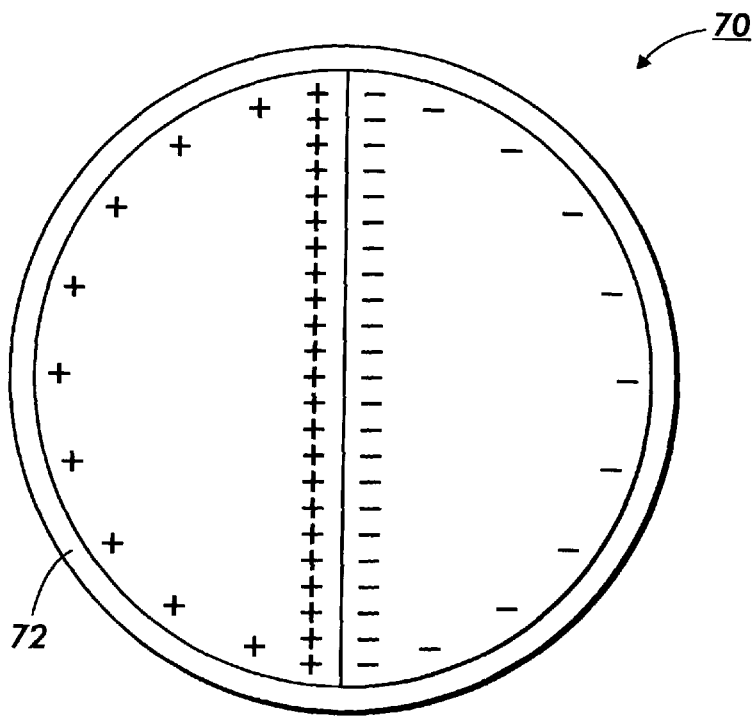
FIG. 7

ROTATION MECHANISM FOR BICHROMAL BALLS OF A TWISTING BALL DISPLAY SHEET BASED ON CONTACT POTENTIAL CHARGING

BACKGROUND OF THE INVENTION

This invention relates to a twisting ball display sheet containing bichromal balls, and more particularly, to a mechanism utilized in a twisting bichromal ball display sheet to rotate the twisting balls without using Zeta potential.

A twisting ball display sheet comprises a thin transparent sheet which has many attributes of a paper document. It looks like paper, has ambient light valve behavior like paper (for example, the brighter the ambient light, the more easily it may be seen), is flexible like paper, can be carried around like paper, can be copied like paper, and has nearly the archival memory of paper.

Referring to FIG. 1, there is shown a cross sectional view of a portion of a prior art twisting ball display sheet 10 which comprises a plurality of bichromal balls B which have a black hemisphere b on one side and a white hemisphere w on the other side. Such a display is disclosed in the U.S. Pat. No. 4,126,854 titled "Twisting Ball Panel Display".

Typically, the bichromal balls B consist of pigmented particles suspended in a substantially transparent sheet 12 made from a material such as elastomer. Each ball B is located in a cavity 14 within the transparent sheet 12. The cavities are slightly larger than the size of the balls B such that each ball B has freedom to rotate or otherwise move slightly within its cavity. The volume 16 of each cavity 14 not occupied by a ball B is filled with a dielectric liquid.

In FIG. 1, looking at the display sheet 10 from the top in the direction shown as d, since only the white hemispheres w of all the balls B are visible, the display sheet is seen as a blank display sheet (assuming that the background of the display sheet is white). Once a ball B is rotated to have its black hemisphere visible, a black dot on the display sheet will be generated. The balls B can be selectively rotated to display a desired image or text.

Currently, several mechanisms are used to create a dipole moment to rotate the balls in a twisting ball display sheet. Typically, they rely on electrical anisotropy due to hemispherical surface coatings of different Zeta potential and their distribution in a volume of a dielectric liquid.

It is an object of this invention to use a different mechanism than Zeta potential to provide a greater dipole moment.

SUMMARY OF THE INVENTION

In accordance with the present invention, there is disclosed a twisting ball display which utilizes a plurality of bichromal balls. Each one of the bichromal balls comprises two different materials. Each one of the materials has an electronic work function which is different than the electronic work function of the other material. The two different work functions of each bichromal ball generate a dipole moment which at the presence of a proper electric field will cause the twisting ball to rotate.

BRIEF DESCRIPTION OF THE DRAWINGS

FIG. 6 shows the twisting ball display sheet of FIG. 5 at the presence of electric fields;

FIG. 7 shows a magnified view of an alternative bichromal ball of this invention.

DETAILED DESCRIPTION OF THE INVENTION

This invention utilizes the electronic properties of the materials used in the structure of balls of a twisting ball display sheet to create dipole moment to rotate the twisting balls.

Figure 1:
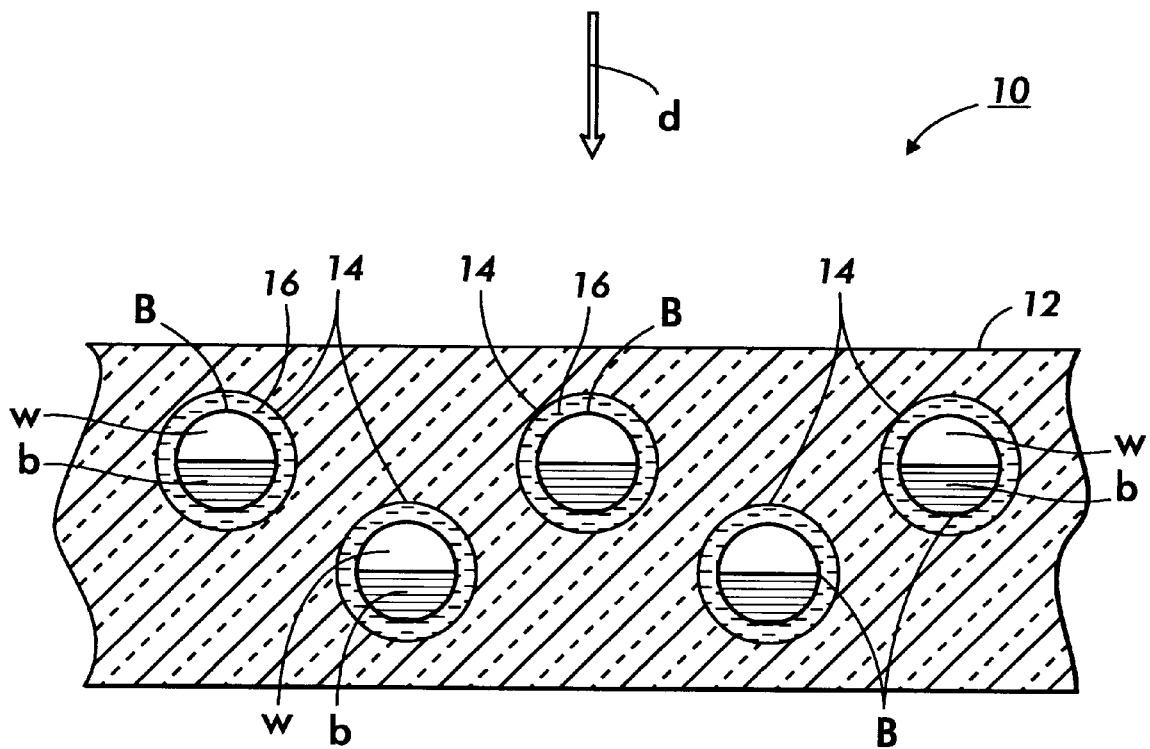
FIG. 1 shows a cross sectional view of a prior art twisting ball display sheet.
Figure 2:
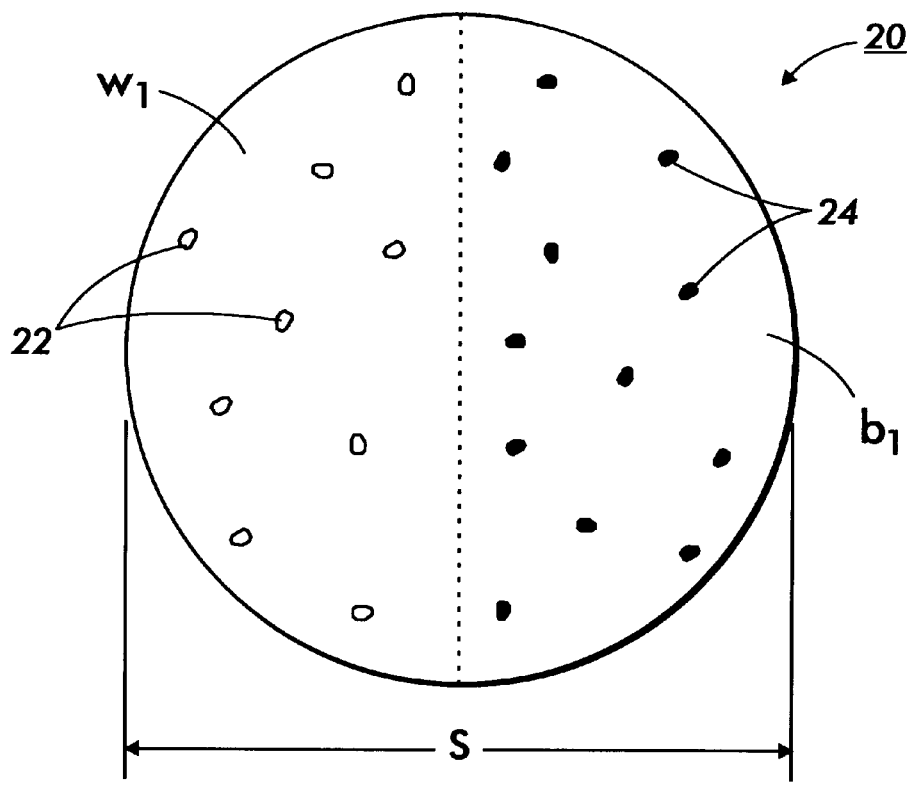
FIG. 2 shows a magnified view of a bichromal ball of this invention.

Referring to FIG. 2, there is shown a magnified view of a bichromal ball 20 of this invention. Hemisphere $w_1$ contains white pigment particles 22 and hemisphere $b_1$ contains black pigment particles 24. The pigment particles in each hemisphere are kept together with a binder material such as glass or polymer and the two hemispheres are attached to each other by the same binder material. Since each bichromal ball represents a pixel or sub-pixel on a display, in order to create a high resolution display, the size S of each bichromal ball has to be decreased to be equal to the size of a pixel. With the present technology, bichromal balls in the range of 10 to 20 micron diameter are desirable.

It should be noted that in this specification, "bichiromal balls" and "balls" are used interchangeably.

Figure 3:
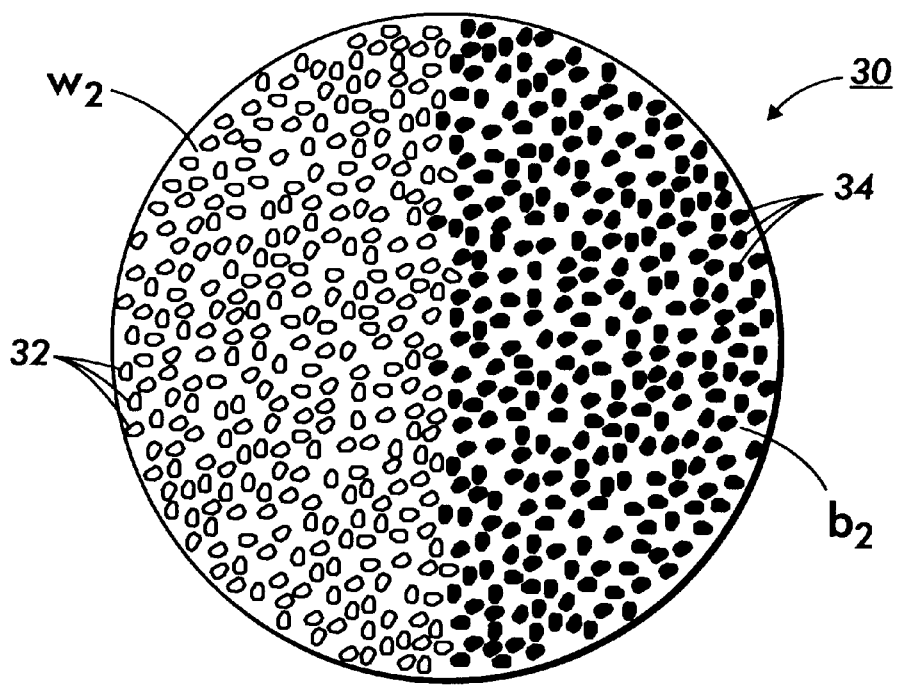
FIG. 3 shows a magnified view of improved version of bichromal ball of FIG. 2.

For a display made from such small balls to exhibit high contrast, it is essential to have a high degree of pigment particle loading in each hemisphere of each ball. One approach to have a high degree of pigment particle is to make each hemisphere with pigment particles and enough binder material to hold the pigment particles together as shown in FIG. 3. Comparing ball 30 of FIG. 3 to ball 20 of FIG. 2, ball 30 has more white pigment particles 32 in the white hemisphere $w_2$ and more black pigment particles 34 in the black hemisphere $b_2$.

In this invention it is suggested to utilize metallic or semiconducting material as pigment particles in the structure of the bichromal balls. There are two reasons for utilizing the above materials. First, various colors can be found among the pigment particles of metal oxides or mixtures of metal oxides. Second, if each hemisphere of a bichromal ball is made of metallic or semiconducting materials, the two hemispheres can freely exchange mobile electrons. The latter is the basis of the rotation mechanism of the bichromal balls of this invention.

Figure 4:
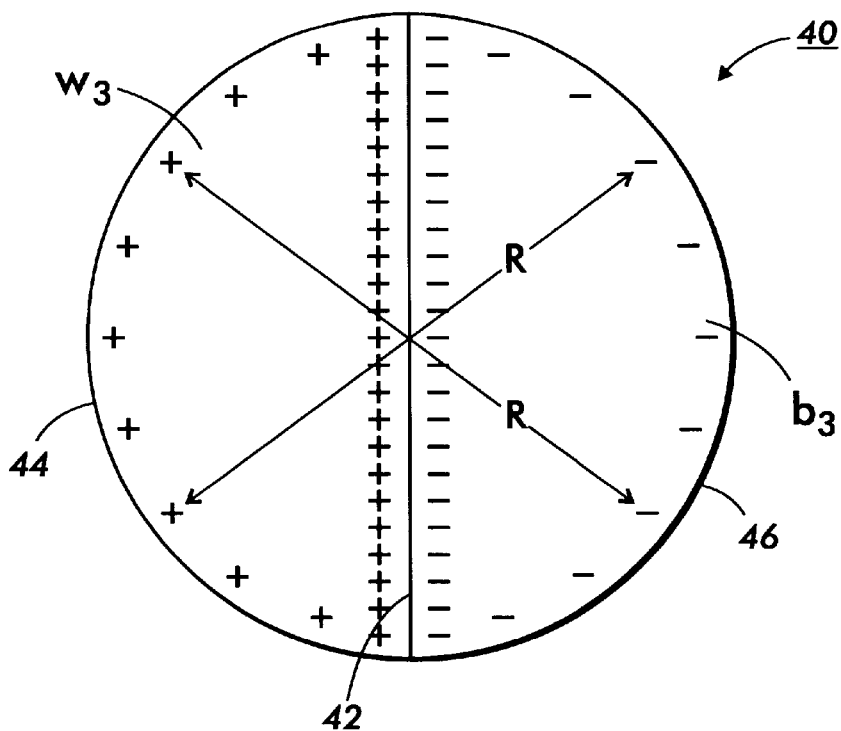
FIG. 4 shows a magnified view of a bichromal ball of this invention with two hemispheres and their charges.

Referring to FIG. 4, there is shown a bichromal ball 40 with two hemispheres $w_3$ and $b_3$. In FIG. 4, each one of the hemispheres $w_3$ and $b_3$ is shown by its electrical charges. The electrical charges on each hemisphere is generated via a contact potential. To understand the contact potential, it is necessary to study electronic work function which is a an electrical property of any material.

The electronic work function represents the amount of energy necessary to remove a single electron from a material, and to take it to infinite distance. Left isolated, an electrically neutral material, which is either conducting or semiconducting, will reach a state of uniform potential wherein the potential difference between any two points in the material is zero. This is possible because the chemical potential is uniform throughout the material.

However, two different materials which are in contact with each other and have different electronic work functions will exchange electrical charge so as to establish a uniform electrical potential difference between the two materials to compensate for their difference in work functions. This process is accomplished by the movement of the electrons from the material with lower electronic work function to the material with higher electronic work function. This mechanism is well known in the industry and described in any text on semiconductor devices. In the above process, the difference in the electronic work functions of the two contacting materials is called "contact potential".

As the number of the pigment particles in each material is increased, a more intensely colored hemisphere is created and also the movement of the electrons in each hemisphere is enhanced. The increased number of pigment particles in each material causes the distance between the pigment particles to decrease. The shorter distance between the pigment particles facilitates and speeds the movement of electrons. As a result, a shorter time is required to reach an equilibrium between the electronic work functions of the materials of the two hemispheres. Furthermore, as the number of the pigment particles in each material is increased, each hemisphere will behave more like a large piece of its constituent pigment particle.

Referring back to FIG. 4, the positive (+) charges on hemisphere $w_3$ and the negative (−) charges on hemisphere $b_3$ are generated based on the above phenomenon. Hemisphere $w_3$ has a different material than hemisphere $b_3$ and the two materials have different electronic work functions. The electronic work function of the material in hemisphere $b_3$ is higher than the electronic work function of the material in hemisphere $W_3$. As a result, the electrons from hemisphere $w_3$ move into hemisphere $b_3$. Each hemisphere prior to contact with the other hemisphere is electrically neutral. Therefore, once the electrons start moving between the two hemispheres, hemisphere $W_3$ which loses electrons becomes positively charged and hemisphere $b_3$ which receives electrons becomes negatively charged. The potential created by this motion of charges is called contact potential.

The equilibrium between the two hemispheres requires the charges to move to the surface of the hemispheres. Most of the charge in each hemisphere accumulates along the contact surface 42 and a lesser amount of charge accumulates along the outer surfaces 44 and 46. Any opposite charges separated by some distance will produce a dipole moment. Therefore, the positive (+) charges on surface 44 and the negative (−) charges on surface 46 which are separated from each other by distance R, will produce a dipole moment for the bichromal ball 40. Also, the positive (+) charges and negative (−) charges on the contact surfaces 42 produce a dipole moment. The dipole moment when exposed to an external electric field will cause a torque which rotates the bichromal ball 40.

The distance between the positive (+) and the negative (−) charges of surfaces 44 and 46 are much larger than the distance between the positive (+) and the negative (−) charges of the contact surface 42. Therefore, one might assume that the dipole moment created by the charges on surfaces 44 and 46 is much larger than the dipole moment created by the charges along the contact surface 42. On the contrary, since the number of charges along the contact surface is much larger than the number of charges along the surfaces 44 and 46, the dipole moment created by the charges along the contact surface is at a comparable magnitude to the dipole moment created by the charges on surfaces 44 and 46.

The contribution of the positive (+) and negative (−) charges on the contact surfaces 42 to the dipole moment can be calculated by:

$$P_{surface1} = \pi \alpha^2 \epsilon \Delta V \tag{1}$$

where $\alpha$ is the ball radius, $\epsilon$ is the dielectric permittivity of surrounding medium of the ball, and $\Delta V$ is the difference in the electronic work function of the two materials of the ball.

The contribution of the positive (+) and negative (−) charges on the surfaces 44 and 46 to the dipole moment can be calculated by:

$$P_{surface2} = 2\pi \alpha^2 \epsilon \Delta V. \tag{2}$$

Therefore, the total contribution of the charges on the contact surface 42, the surface 44 and the surface 46 can be calculated by:

$$P_{total} = P_{surface1} + P_{surface2} = \pi \alpha^2 \epsilon \Delta V + 2\pi \alpha^2 \epsilon \Delta V = 3\pi \alpha^2 \epsilon \Delta V \tag{3}$$

Equation (1) indicates that the dipole moment is dependent on the size of the ball, the difference in work functions of the two materials and the permittivity of surrounding medium of the ball. Since the size of the balls is dictated by the number of the pixels on each sheet, the size of the balls can not be modified. Therefore, modifying the dipole moment can be achieved by selecting proper materials for the bichromal balls and proper surrounding medium (different liquids or gases).

Using semiconductors provides a significant amount of flexibility in achieving different levels of work functions and as a result different levels of dipole moments. The work function of a semiconductor can be adjusted by proper doping. For example, the work function of TiO2, which is a common white pigment particle, can be modified by chemical reduction, or diffusion of other metals. Therefore, different semiconductors can be selected and their work functions can be modified to achieve a certain dipole moment.

It should be noted that the semiconductors used in the structure of the bichromal balls can be replaced by metals. However, the work function of metals can not be modified. Therefore, using a metal requires a more accurate selection of materials to generate a certain dipole moment.

It should also be noted that in this invention, one hemisphere of each bichromal ball can be metal and the other hemisphere can be semiconductor.

In this invention, the dipole moment generated is in the range of 1–2 Volts. This is a significant increase in the dipole moment in comparison to the dipole moment generated by Zeta potential which is in the range of 25–100 milli-Volts.

The dipole moment created in this invention is based on the large body of the knowledge which exists in solid states physics, and avoids the need for surface chemical effects to produce a dipole moment.

As opposed to surface chemical effects which require the surrounding liquid to have charges to produce Zeta potential, in this invention, the surrounding liquid has to be free of charge (inert). If the surrounding liquid has any charges, the charges in the liquid will neutralize the surface charges and disable the dipole moment of the balls. Therefore, in the above disclosed embodiment of this invention, the surrounding liquid has to be inert.

It should be noted that, in this invention, the surrounding liquid can be replaced by an inert gas.

It should further be noted that in this specification the term "inert" shall mean "a liquid or a gas which does not dissolve or otherwise adversely affect the bichromal balls and does not contain substantial amount of charge species to neutralize the charges of the bichromal balls".

Figure 5:
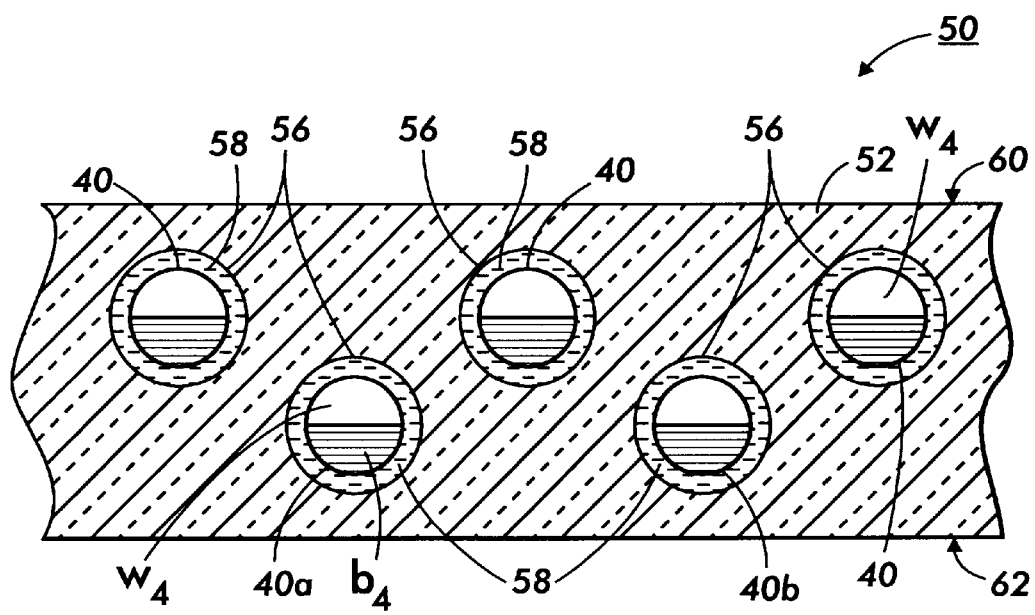
FIG. 5 shows a twisting ball display sheet of this invention which utiiizes the bichromal balls of FIG. 4.

Referring to FIG. 5, there is shown a cross sectional view of a twisting ball display sheet 50 of this invention which utilizes the bichromal balls 40 of FIG. 4. In FIG. 5, the display sheet 50 comprises a substantially transparent sheet 52 made from a material such as an elastomer. The transparent sheet 52 has a plurality of bichromal balls 40. Each bichromal ball 40 is located in a cavity 56 within the transparent sheet 52. Each cavity 56 is slightly larger than its respective ball 40 such that ball 40 has freedom to rotate. The remaining portion 58 of each cavity 56 which is not occupied by its respective ball 40, is filled with an inert liquid. In FIG. 5, for the purpose of discussion, it is assumed that the white hemisphere $w_4$ of the bichromal balls 40 are facing the top surface 60 of the display sheet 50. Furthermore, it is assumed that the white hemispheres $w_4$ have a positive (+) charges.

Referring to FIG. 6, there is shown the twisting ball display sheet 50 of FIG. 5 at the presence of electric fields. In FIG. 6, those elements which are the same as disclosed in the description of FIG. 5 are designated by the same reference numerals. By applying a proper electric field to each bichromal ball 40, the bichromal ball 40 will rotate. In this specification, "an electric field with a proper polarity" shall mean "an electric field which causes a twisting ball to rotate".

For example, in FIG. 6, the electric field $E_1$ has its positive (+) terminal above the top surface 60 of the display sheet 50 and its negative (−) terminal below the bottom surface 62 of the display sheet 50. Referring to both FIGS. 5 and 6, by applying the electric filed $E_1$, the bichromal ball $40_a$ which is located within the electric field $E_1$ will rotate. The positive (+) terminal of the electric field $E_1$ attracts the negative charges of the black hemisphere $b_4$ and the negative terminal of the electric filed $E_1$ attracts the positive (+) charges of the white hemisphere $w_4$. Therefore, the white hemisphere $w_4$ faces surface 62 and the black hemisphere $b_4$ faces surface 60.

However, by applying electric field $E_2$, which has its negative (−) terminal above the top surface 60 and its positive (+) terminal below the bottom surface, the twisting ball $40_b$ within the electric filed $E_2$, will not rotate. Since the positive (+) charges of the white hemisphere $w_4$ will be attracted to the negative (−) terminal of the electric filed $E_2$ and the negative (−) charges of the black hemisphere $b_4$ will be attracted to the positive (+) terminal of the electric field $E_2$, the twisting ball $40_b$ will not rotate. Therefore, the electric field $E_1$ has a proper polarity and the electric field $E_2$ does not.

Referring to FIG. 7, there is shown an alternative bichromal ball 70 of this invention which can be placed in a liquid or gas containing electrical charges. In FIG. 7, ball 70 is the same and serves the same purpose as the ball 40 of FIG. 4. The only difference between ball 70 and ball 40 of FIG. 4 is that ball 70 has a layer of coating 72 which prevents the charges of surrounding liquid (not shown) to neutralize the positive (+) and negative (−) surface charges of the ball 70. Any material with similar or lower permittivity as the permittivity of the surrounding material can be used as the coating layer. An example of such material is a fluoropolymer.

Figure 8:
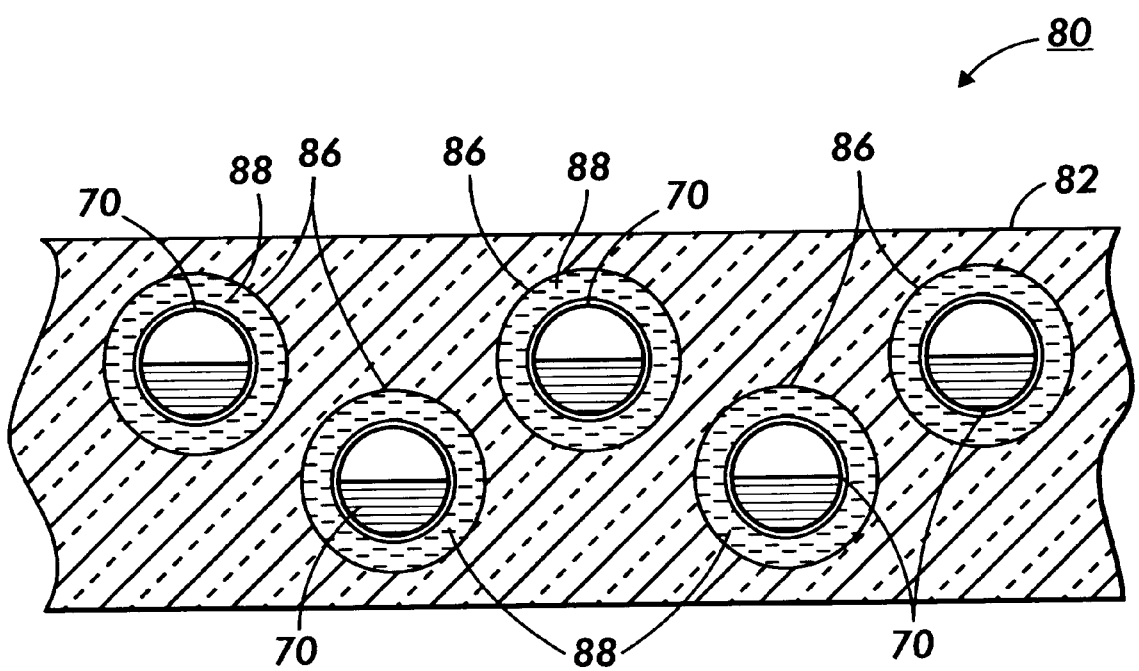
FIG. 8 shows a twisting ball display sheet of this invention which utilizes the bichromal balls of FIG. 7.

Referring to FIG. 8, there is shown a twisting ball display sheet 80 of this invention which utilizes the bichromal balls 70 of FIG. 7. In FIG. 8, the display sheet 80 comprises a substantially transparent sheet 82 made from a material such as an elastomer. The transparent sheet 82 has a plurality of bichromal balls 70. Each bichromal ball 70 is located in a cavity 86 within the transparent sheet 82. Each cavity 86 is slightly larger than its respective bichromal ball 70 such that ball 70 has freedom to rotate. The remaining portion 88 of each cavity 86 which is not occupied by its respective ball 70, is filled with a liquid which has electrical charges.

Using the disclosed embodiments of this invention eliminates the need to create a Zeta potential by surface chemical effects and provides a larger dipole moment.

It should be noted that numerous changes in details of construction and the combination and arrangement of elements may be resorted to without departing from the true spirit and scope of the invention as hereinafter claimed.

I claim:

1. A twisting ball display comprising:

a substantially transparent sheet having a plurality of cavities and a plurality of bichromal balls;

each of said plurality of bichromal balls being located in one of said plurality of cavities;

each of said plurality of bichromal balls having a first hemisphere and a second hemisphere;

said first hemisphere having a first electronic work function and said second hemisphere having a second electronic work function;

said first hemisphere and said second hemisphere of each one of said plurality of bichromal balls being so constructed and arranged that said first electronic work function and said second electronic work function of each one of said plurality of bichromal balls generate a dipole moment on said bichromal ball in such a manner that when each one of said plurality of bichromal balls is placed within an electric field, with a proper polarity, said respective bichromal ball rotates.

2. The twisting ball display recited in claim 1, wherein said first hemisphere and said second hemisphere are both semi-conductors.

3. The twisting ball display recited in claim 1, wherein said first hemisphere and said second hemisphere are both metals.

4. The twisting ball display recited in claim 1, wherein said first hemisphere is semiconductor and said second hemisphere is metal.

5. The twisting ball display recited in claim 1, wherein each of said plurality of cavities is larger than its respective bichromal balls.

6. The twisting ball display recited in claim 5, wherein each one of said plurality of bichromal balls occupies a portion of said cavity and the remaining portion of said cavity which is not occupied by said bichromal ball is filled with an inert liquid.

7. The twisting ball display recited in claim 6, wherein said first hemisphere and said second hemisphere are both semi-conductors.

8. The twisting ball display recited in claim 6, wherein said first hemisphere and said second hemisphere are both metals.

9. The twisting ball display recited in claim 6, wherein said first hemisphere is semiconductor and said second hemisphere is a metal.

10. The twisting ball display recited in claim 5, wherein each one of said plurality of bichromal balls occupies a portion of said cavity and the remaining portion of said cavity which is not occupied by said bichromal ball is filled with an inert gas.

11. The twisting ball display recited in claim 10, wherein said first hemisphere and said second hemisphere are both semi-conductors.

12. The twisting ball display recited in claim 10, wherein said first hemisphere and said second hemisphere are both metals.

13. The twisting ball display recited in claim 10, wherein said first hemisphere is semiconductor and said second hemisphere is a metal.

14. The twisting ball display recited in claim 5, wherein each one of said plurality of bichromal balls has a coating.

15. The twisting ball display recited in claim 14, wherein each one of said plurality of bichromal balls occupies a portion of said cavity and the remaining portion of said cavity which is not occupied by said bichromal ball is filled with a non-inert liquid.

16. The twisting ball display recited in claim 15, wherein said first hemisphere and said second hemisphere are both semi-conductors.

17. The twisting ball display recited in claim 15, wherein said first hemisphere and said second hemisphere are both metals.

18. The twisting ball display recited in claim 15, wherein said first hemisphere is semiconductor and said second hemisphere is a metal.

19. The twisting ball display recited in claim 14, wherein each one of said plurality of bichromal balls occupies a portion of said cavity and the remaining portion of said cavity which is not occupied by said bichromal ball is filled with a non-inert gas.

20. The twisting ball display recited in claim 19, wherein said first hemisphere and said second hemisphere are both semi-conductors.

21. The twisting ball display recited in claim 19, wherein said first hemisphere and said second hemisphere are both metals.

22. The twisting ball display recited in claim 19, wherein said first hemisphere is semiconductor and said second hemisphere is a metal.

* * * * *